(12) United States Patent
Lubchansky et al.

(10) Patent No.: US 9,086,085 B2
(45) Date of Patent: Jul. 21, 2015

(54) REMOVEABLE FASTENER RECESS INSERT AND METHOD FOR MAKING SAME

(75) Inventors: Adam B. Lubchansky, St. Louis, MO (US); Mike McCracken, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 1844 days.

(21) Appl. No.: 11/459,998

(22) Filed: Jul. 26, 2006

(65) Prior Publication Data

US 2008/0025815 A1    Jan. 31, 2008

(51) Int. Cl.
*F16B 37/14*    (2006.01)
*F16B 23/00*    (2006.01)

(52) U.S. Cl.
CPC ............. *F16B 23/0007* (2013.01); *F16B 37/14* (2013.01)

(58) Field of Classification Search
USPC ............. 411/108, 244, 339, 372.5–373, 377, 411/431, 501, 504, 908, 910
See application file for complete search history.

(56) References Cited

U.S. PATENT DOCUMENTS

| | | | | | |
|---|---|---|---|---|---|
| 1,296,165 | A | * | 3/1919 | Costuma | 411/406 |
| 3,065,662 | A | * | 11/1962 | Spoehr et al. | 411/399 |
| 3,301,122 | A | * | 1/1967 | Wagner | 411/361 |
| 3,405,595 | A | * | 10/1968 | Peterson | 411/405 |
| 3,425,313 | A | * | 2/1969 | Villo | 411/373 |
| 4,413,374 | A | * | 11/1983 | Ferdinand et al. | 16/441 |
| 4,630,168 | A | * | 12/1986 | Hunt | 361/218 |
| 4,884,929 | A | * | 12/1989 | Smith et al. | 411/3 |
| 4,964,594 | A | * | 10/1990 | Webb | 244/131 |
| 4,975,006 | A | * | 12/1990 | Swanson | 411/19 |
| 5,449,260 | A | * | 9/1995 | Whittle | 411/377 |
| 5,603,472 | A | * | 2/1997 | Hutter, III | 244/132 |
| 5,788,442 | A | * | 8/1998 | Eder | 411/373 |
| 6,302,630 | B1 | * | 10/2001 | Grant | 411/372.6 |
| 6,315,485 | B1 | * | 11/2001 | Speck et al. | 403/7 |
| 6,371,707 | B1 | * | 4/2002 | Schaty | 411/339 |
| 6,634,842 | B2 | * | 10/2003 | Ueno | 411/377 |
| 6,641,343 | B1 | * | 11/2003 | Duran | 411/372.6 |
| 2003/0053886 | A1 | * | 3/2003 | Ueno | 411/377 |

* cited by examiner

*Primary Examiner* — Roberta Delisle

(57) ABSTRACT

A fastening system includes a fastener having a head portion and a shaft portion, wherein the head portion has a recess (e.g., a removal tool recess), and an insert (e.g., a plastic insert) having an insert shape substantially equal to the recess shape and an insert thickness substantially equal to or less than the recess depth, wherein the insert is configured to removeably seat within the recess of the head portion. In this way, the insert may be later removed from the recess, allowing easy tool access even in applications where an overlying fairing material or other such conformal coating is used.

15 Claims, 1 Drawing Sheet

REMOVEABLE FASTENER RECESS INSERT AND METHOD FOR MAKING SAME

STATEMENT REGARDING FEDERALLY SPONSORED RESEARCH OR DEVELOPMENT

This invention was made with Government support under Contract No. MDA972-99-9-0003. The Government has certain rights in this invention.

TECHNICAL FIELD

The present invention generally relates to fastener technology and, more particularly, to fasteners with tool recesses that are traditionally filled with a removable material.

BACKGROUND

A wide variety of fasteners are used in connection with manufacturing processes. In aircraft applications, for example, it is common to use a large number of fasteners along a "moldline" surface and then fill the resulting gaps and recesses (e.g., the removal tool recess within the fastener head) with a fairing material or other such conformal coating to produce a relatively smooth surface.

When the filler material fills the tool recess of a fastener, however, it becomes difficult to later remove that fastener when, for example, the skin or panel in which it is used must be removed for maintenance or the like. Often, it is necessary to manually remove the fairing material using a pick or other such digging tool. This task is not only tedious and time-consuming, it is also often ineffective in removing enough material to allow the removal tool to be used effectively. This can lead, for example, to stripping of the recess detail during removal.

Accordingly, it is desirable to provide improved fastening systems for use in conjunction with fairing materials and other conformal coatings. Furthermore, other desirable features and characteristics of the present invention will become apparent from the subsequent detailed description and the appended claims, taken in conjunction with the accompanying drawings and the foregoing technical field and background.

BRIEF SUMMARY

In accordance with the present invention, a removable insert is used to fill the tool recess of the fastener prior to application of the fairing material. In general, a fastening system in accordance with one embodiment includes a fastener having a head portion and a shaft portion, wherein the head portion has a recess (e.g., a removal tool recess), and an insert (e.g., a plastic insert) having an insert shape substantially equal to the recess shape and an insert thickness substantially equal to or less than the recess depth, wherein the insert is configured to removeably seat within the recess of the head portion. In this way, the insert may be later removed from the recess, allowing easy tool access even in applications where an overlying fairing material or other such conformal coating is used.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

For the sake of brevity, conventional techniques related to fastener technology, fastener materials, fastener tooling, and other conventional tools and techniques may not be described in detail herein. It should be noted that many alternative or additional functional relationships or physical connections may be present in a practical embodiment.

In general, the present invention relates to a removable insert provided within the tool recess of a fastener to facilitate easy removal at a later time, particularly in the context of surfaces that are coated by a fairing material or other conformal coating that can be difficult to remove from such recesses.

Figure 2:
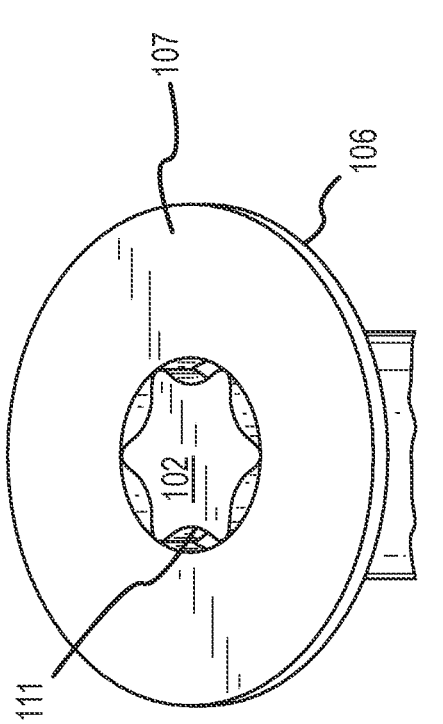
FIG. 2 is a close-up of a fastener head with an insert fitted within the tool recess.
Figure 1:
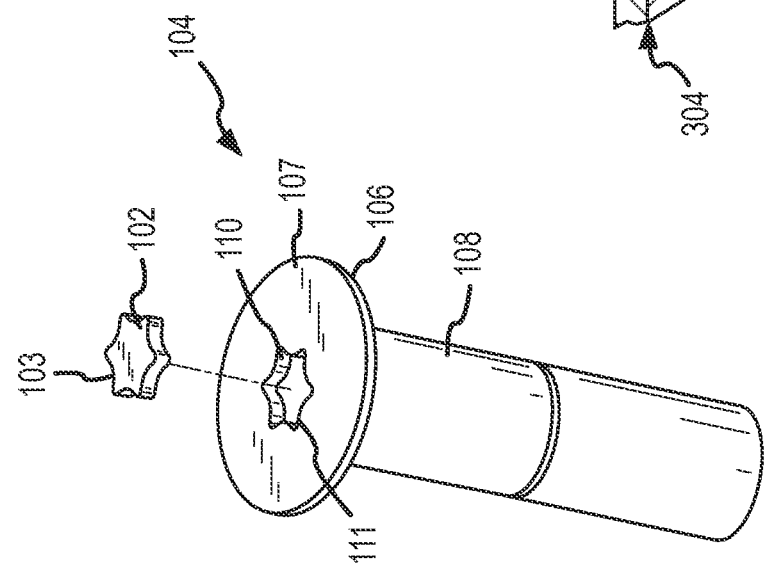
FIG. 1 is an isometric overview of a fastener and removable insert in accordance with one embodiment of the present invention.

Referring to FIG. 1, a fastener 104 in accordance with one embodiment of the present invention generally includes a shaft portion (or "shaft") 108 and a head portion 106, wherein head portion (or simply "head") 106 has a tool recess (or "recess") 110 formed therein. An insert 102 having substantially the same shape as recess 110 is provided, and may be inserted, placed, or otherwise seated within recess 110 such that it might be later removed—either nondestructively or destructively. That is, shape 103 of insert 102 is substantially the same as shape 111 of recess 110. When insert 102 is seated within recess 110, the outer surface of insert 102 substantially conforms to the surface of surface 107. That is, in the case where surface 107 of head 106 is planar, insert 102 is preferably flush with (e.g., substantially coplanar with) surface 107, as shown in FIG. 2, or below surface 107 by a predetermined amount.

In general, fastener 104 may consist of any type of hardware that functions to fix one layer or body to another layer or body. Fastener 104 may be, for example, a screw, rivet, bolt, or any other such component. In this regard, shaft portion 108 of fastener 104 may be threaded, un-threaded, or have any suitable cross-section, depending upon the application. Similarly, head portion 106 of fastener 104 may have any suitable shape and size with respect to shaft 108. In one embodiment, head portion 106 is integral with shaft 108, but the present invention is not so limited.

Figure 3:
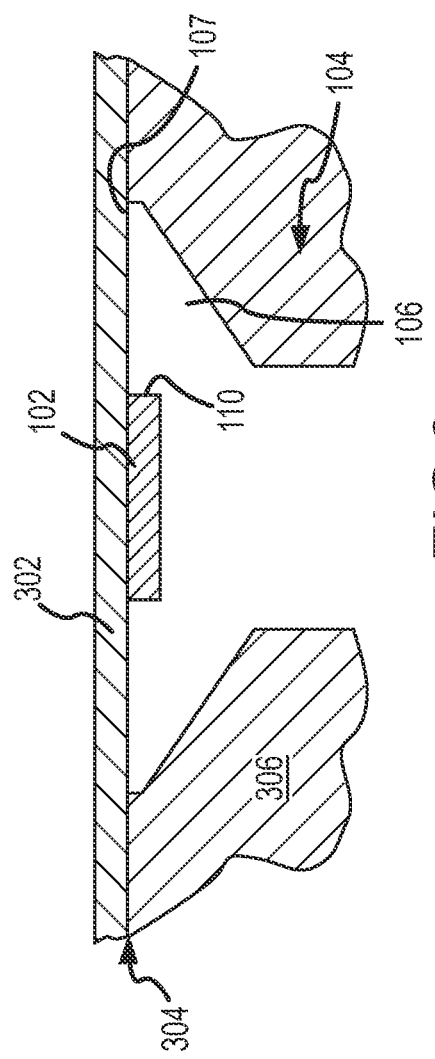
FIG. 3 is a cross-sectional overview of a fastener head and insert covered by a layer of fairing material.

In one embodiment, fastener 104 is of the type used to fix one material layer to another in, for example, an aircraft where a fairing material is dispensed over a set of fasteners inserted within a skin to form a relatively smooth, moldline surface. That is, referring to FIG. 3, fastener 104 is suitably fixed within a skin (or other component) 306 such that it forms a flush moldline surface 304 (or, alternatively, is slightly recessed within skin 306). Insert 102 is placed within recess 110, and a fairing material 302 (e.g., an epoxy or other polymeric layer) is then deposited or otherwise provided over skin 306, surface 107, and insert 102 as shown.

Recess 110 within head 106 may have a variety of shapes, depending upon the nature of the application. Suitable recess shapes include, for example, slotted, Philips, cross-point, Pozidriv, Supadriv, Allen, and (as per the illustration) Torx.

Insert 102 is designed to fit within recess 110—preferably using an interference fit—and is therefore typically configured to have the same outline shape 103 as recess 110, within an appropriate tolerance. While the illustrated insert 102 has a constant cross-section (i.e., a cross-section along a plane parallel to its top surface), it is also possible for insert 102 to be tapered or have any other convenient cross-sectional shape. It is preferred that insert 102 not extend past (or in any way cover) the top surface of head portion 106. Toward that end, the thickness of insert 102 may be the same as the depth of recess 110, or may be slightly thinner—i.e., to prevent unwanted bulges above moldline surface 304. That is, if insert 102 has a thickness that is less than the depth of recess 110, the fairing material can be used to fill up the remaining portion of the recess, thereby maintaining a substantially smooth surface.

A variety of materials are suitable for insert 102. It is preferred that the material is substantially elastic so that it remains seated within recess 110 by virtue of the interference fit. In a particular embodiment, for example, a plastic material such as nylon is used. It will be appreciated that the invention is not so limited, however, and that any other suitable material may be used. In one embodiment, for example, insert 102 may be placed within recess 110 in an uncured or partially-cured state, and then later cured at an appropriate temperature.

Insert 102 may be fabricated in a number of ways, including a variety of conventional processes. In one embodiment, for example, insert 102 is fabricated using rapid prototyping process such as selective laser sintering (SLS), which allows a large number of small inserts to be fabricated with high precision. Other processes, such as extrusion, injection molding, and the like may also be used.

Insert 102 may be placed in recess 110 either manually (by an operator) or automatically (via a pick-and-place machine, robot, or the like). For example, the insert may be simply pressed into place by an operator using a thumb or finger, or may be placed using some form of tool. In one embodiment, for example, a special dispensing/cutting tool is used such that an extruded portion of material having a cross-section corresponding to the shape of recess 110 is pressed into the insert and is then cut away flush with head 106, leaving behind an appropriately positioned insert 102. In yet another embodiment, a gun-like tool with a magazine configured to dispense the inserts is used, much in the same way a staple gun or other such mechanism is employed.

Insert 102 may be removed from recess 110 either destructively or non-destructively using a suitable tool. For example, insert 102 may be pried out of recess 110 using a pin-point or blade-shaped tool (e.g., X-ACTO knife) applied to the perimeter of insert 102 (through any overlying coating). This leaves behind a substantially clean recess, allowing insertion of the removal tool.

It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A fastening system comprising:
   an aircraft fastener having a head portion and a shaft portion extending therefrom, the head portion having a driver recess formed therein, the recess having a recess shape and a recess depth; and
   a pre-made insert consisting of a substantially elastic body having the same shape and depth as the recess prior to being seated in the recess, the insert completely filling the recess of the head portion such that an interference fit forms between the insert and the recess when the insert is seated within the recess.

2. The fastening system of claim 1, wherein the insert comprises a plastic material.

3. The fastening system of claim 2, wherein the insert comprises nylon.

4. The fastening system of claim 1, wherein the insert conforms to an outer shape of the head portion of the fastener when seated within the head portion.

5. The fastening system of claim 4, wherein the head portion is substantially planar, and wherein the insert, when seated within the recess, is substantially flush with the head portion of the fastener.

6. The fastening system of claim 1, wherein the insert shape has rotational symmetry.

7. A method of using the fastening system of claim 1, comprising automatically inserting the insert in the recess of the head portion.

8. A method of using the fastening system of claim 1, comprising using a gun-like tool with a magazine to dispense the insert in the recess of the head portion.

9. An apparatus comprising:
   aircraft skin;
   a fastener configured to attach to the skin, the fastener including a head portion having a non-cylindrical driver recess;
   a pre-made insert within the recess, the pre-made insert consisting of a body having substantially the same outline shape and depth as the recess, the insert seated within the recess such that an interference fit forms between the insert and the recess, the insert completely filling the recess, the insert not being adhered to the head portion; and
   aircraft fairing material over the skin, fastener and insert to form a relatively smooth moldline surface;
   whereby the insert can be removed from the recess, leaving a relatively clean recess.

10. The apparatus of claim 9, wherein the body is substantially elastic.

11. The apparatus of claim 9, wherein the insert comprises a plastic material.

12. The apparatus of claim 9, wherein the insert comprises nylon.

13. The apparatus of claim 9, wherein the insert conforms to an outer shape of the head portion of the fastener when seated within the head portion.

14. The apparatus of claim 13, wherein the head portion is substantially planar, and wherein the insert, when seated within the recess, is substantially flush with the head portion of the fastener.

15. The apparatus of claim 9, wherein the insert shape has rotational symmetry.

* * * * *